United States Patent [19]

Kimura

[11] Patent Number: 5,028,785
[45] Date of Patent: * Jul. 2, 1991

[54] RADIATION IMAGE RECORDING AND READ-OUT APPARATUS

[75] Inventor: Tsutomu Kimura, Kanagawa, Japan

[73] Assignee: Fuji Photo Film Co., Ltd., Kanagawa, Japan

[*] Notice: The portion of the term of this patent subsequent to Feb. 13, 2007 has been disclaimed.

[21] Appl. No.: 755,992

[22] Filed: Jul. 17, 1985

[30] Foreign Application Priority Data

Jul. 20, 1984 [JP] Japan ................................ 59-150997

[51] Int. Cl.⁵ .......................................... G01V 1/161
[52] U.S. Cl. ............................. 250/327.2; 250/484.1
[58] Field of Search ........................... 250/327.2, 484.1

[56] References Cited

U.S. PATENT DOCUMENTS

| | | | |
|---|---|---|---|
| 4,485,304 | 11/1984 | Yeraoka et al. | 250/327.2 |
| 4,578,582 | 3/1986 | Yakamo | 250/327.2 |
| 4,584,482 | 4/1986 | Suzuki et al. | 250/327.2 |

Primary Examiner—Janice A. Howell
Assistant Examiner—Richard Hanig
Attorney, Agent, or Firm—Sughrue, Mion, Zinn, MacPeak & Seas

[57] ABSTRACT

Stimulable phosphor sheets are circulated through an image recording section for recording radiation images on the stimulable phosphor sheets, an image read-out section for scanning the stimulable phosphor sheets by stimulating rays and detecting light emitted thereby upon stimulation, and an erasing section for releasing radiation energy remaining in the stimulable phosphor sheets after image read-out. The level of residual radiation energy in each stimulable phosphor sheet ejected from the erasing section is detected and compared with a predetermined value. When a stimulable phosphor sheet detected to exhibit a residual radiation energy level exceeding the predetermined value is fed to the image recording section, the stimulable phosphor sheet is passed through the image recording section without being subjected to image recording.

7 Claims, 1 Drawing Sheet

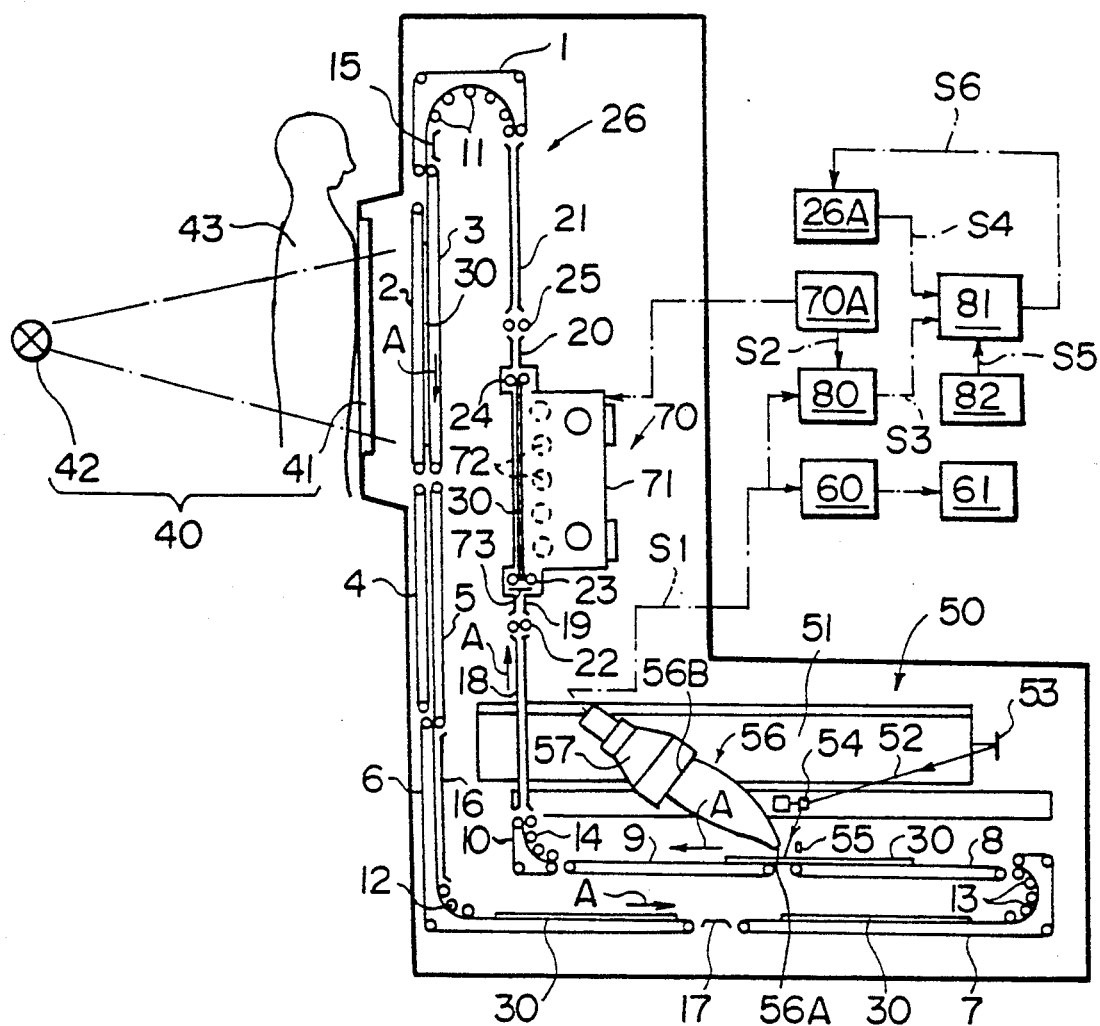

RADIATION IMAGE RECORDING AND READ-OUT APPARATUS

BACKGROUND OF THE INVENTION

1. Field of the Invention

This invention relates to a radiation image recording and read-out apparatus for exposing stimulable phosphor sheets to a radiation passing through an object to have a radiation image of the object stored therein, exposing the stimulable phosphor sheets to stimulating rays which cause them to emit light in proportion to the stored radiation energy, and detecting and converting the emitted light into electric signals. This invention particularly relates to a radiation image recording and read-out apparatus in which the stimulable phosphor sheets are circulated and reused for recording radiation images.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428, and Japanese Unexamined Patent Publication No. 56(1981)-11395, it has been proposed to use a stimulable phosphor in a radiation image recording and reproducing system. Specifically, a sheet comprising the stimulable phosphor is first exposed to a radiation passing through an object to have a radiation image stored therein, and is then scanned with stimulating rays which cause it to emit light in proportion to the radiation energy stored. The light emitted from the stimulable phosphor sheet when the sheet is exposed to the stimulating rays is photoelectrically detected and converted to an electric image signal, which is processed as desired to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom in a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for use in the aforesaid radiation image recording and reproducing system and moves from place to place to record radiation images for mass medical examinations, it is disadvantageous to load the mobile X-ray diagnostic station with a large number of stimulable phosphor sheets, and the number of the stimulable phosphor sheets can be loaded on the mobile X-ray diagnostic station is limited. Therefore, it is desired to load the mobile X-ray diagnostic station with stimulable phosphor sheets which can be used repeatedly, store the radiation images of the objects in the stimulable phosphor sheets, transfer the electric image signals read out from the stimulable phosphor sheets into a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examination. This is very advantageous in practical use.

In order to reuse stimulable phosphor sheets as described above, the radiation energy remaining in the stimulable phosphor sheet after it is scanned with stimulating rays to read out the radiation image stored therein should be erased by exposure to light or heat as described, for example, in Japanese Unexamined Patent Publication No. 56(1981)-12599 or U.S. Pat. No. 4,400,619. The stimulable phosphor sheet should then be used again for radiation image recording.

From the aforesaid viewpoint, the applicant proposed in Japanese Patent Application No. 58(1983)-66730 a built-in type radiation image recording and read-out apparatus comprising:

i) a circulating and conveying means for conveying at least one stimulable phosphor sheet for recording a radiation image thereon along a predetermined circulation path, ii) an image recording section positioned on said circulation path for recording a radiation transmission image of an object on said stimulable phosphor sheet by exposing said stimulable phosphor sheet to a radiation passing through said object, iii) an image read-out section positioned on said circulation path and provided with a stimulating ray source for emitting stimulating rays for scanning said stimulable phosphor sheet carrying said radiation image stored therein in said image recording section, and a photoelectric read-out means for detecting light emitted from said stimulable phosphor sheet scanned with said stimulating rays to obtain an electric image signal, and iv) an erasing section for, prior to the next image recording on said stimulable phosphor sheet for which the image read-out has been conducted in said image read-out section, having said stimulable phosphor sheet release the radiation energy remaining in said stimulable phosphor sheet, whereby said stimulable phosphor sheet is circulated through said image recording section, said image read-out section and said erasing section and reused for radiation image recording.

In the aforesaid radiation image recording and read-out apparatus, recording and read-out of radiation images can be conducted continuously and efficiently.

At the erasing section of the aforesaid radiation image recording and read-out apparatus, the stimulable phosphor sheet is exposed to light or heat to release the residual radiation energy from the sheet. In order to make the stimulable phosphor sheet reusable for image recording, it is necessary to expose the sheet to more light or heat as the level of the residual radiation energy becomes higher. (Because the amount of the residual radiation energy released increases as the light or heat exposure amount is increased.) Therefore, when the light or heat exposure amount at the erasing section is maintained constant, the exposure amount is adjusted so that the normally assumed maximum level of the residual radiation energy in the stimulable phosphor sheet can be released almost completely, i.e. to such as extent that no problem is caused by the residual radiation energy in the next image recording. On the other hand, when the light or heat exposure amount at the erasing section is controlled in accordance with the level of the residual radiation energy in the stimulable phosphor sheet for the purpose of decreasing the energy and time required for image erasing, the maximum exposure amount is adjusted to such a value that the normally assumed maximum level of the residual radiation energy in the stimulable phosphor sheet can be released almost completely.

However, in the case of a special radiation image recording, the stimulable phosphor sheet is exposed to a radiation in amount very much larger than usual. In the stimulable phosphor sheet exposed to a large amount of the radiation, the level of the residual radiation energy after image read-out often exceeds the normally assumed maximum value. Therefore, when the stimulable phosphor sheet carrying the high level of residual radiation energy is sent to the erasing section, the sheet should desirably be exposed to light or heat for long time to make the sheet reusable for image recording.

However, if the stimulable phosphor sheet exposed to the large amount of the radiation as described above is subjected to prolonged image erasing at the erasing section, the erasing section becomes a bottleneck in the flow of the stimulable phosphor sheet, and the image recording and read-out processing must be interrupted.

SUMMARY OF THE INVENTION

The primary object of the present invention is to provide a radiation image recording and read-out apparatus which prevents the erasing section from becoming a bottleneck to the flow of the stimulable phosphor sheets and sufficiently increases the image recording and read-out processing speeds.

Another object of the present invention is to provide a radiation image recording and read-out apparatus which is small and suitable for loading on a vehicle or the like.

The present invention provides a radiation image recording and read-out apparatus comprising:

i) a circulating and conveying means for conveying a plurality of stimulable phosphor sheets for recording radiation images thereon along a predetermined circulation path, ii) an image recording section positioned on said circulation path for recording the radiation image of an object on each of said stimulable phosphor sheets by exposing said stimulable phosphor sheet to a radiation passing through said object, iii) an image read-out section positioned on said circulation path and provided with a stimulating ray source for emitting stimulating rays for scanning said stimulable phosphor sheet carrying said radiation image stored therein at said image recording section, and a photoelectric read-out means for detecting light emitted by said stimulable phosphor sheet scanned by said stimulating rays to obtain an electric image signal, iv) an erasing section positioned on said circulation path for, prior to the next image recording on said stimulable phosphor sheet for which the image read-out has been conducted at said image read-out section, having said stimulable phosphor sheet release the radiation energy remaining in said stimulable phosphor sheet, v) an energy level detecting means for detecting the level of residual radiation energy in said stimulable phosphor sheet ejected from said erasing section, and vi) a control means for receiving the output of said energy level detecting means and controlling said circulating and conveying means so that, when a stimulable phosphor sheet detected to exhibit a residual radiation energy level exceeding a predetermined value (i.e. a level causing a problem in image recording) is fed to said image recording section, said stimulable phosphor sheet is passed through said image recording section without being subjected to image recording.

In the radiation image recording and read-out apparatus of the present invention, since stimulable phosphor sheets are circulated through the image recording section, the image read-out section and the erasing section, it is possible to use the stimulable phosphor sheet repeatedly for image recording and to make the apparatus compact. Therefore, the apparatus is suitable for loading on a vehicle or the like. Also, since image erasing need not be conducted for a long time at the erasing section even for a stimulable phosphor sheet which was exposed to a large amount of a radiation, the sheet flow does not become congested at the erasing section. Further, since the stimulable phosphor sheet exposed to the large amount of the radiation is passed through the image recording section without being subjected to image recording, it is possible to avoid recording of an incorrect radiation image and to conduct radiation image recording and read-out continuously and quickly by sequentially using the other stimulable phosphor sheets which do not require a long time for image erasing.

The stimulable phosphor sheet which is passed through the image recording section without being subjected to image recording is circulated along the circulation path and passed through the erasing section one or more times further. In this manner, the residual radiation energy in the stimulable phosphor sheet is eventually released to such an extent that the sheet is reusable for image recording. Then, the stimulable phosphor sheet is normally used for image recording and read-out. In the case where the radiation image recording and read-out operations are finished before the stimulable phosphor sheet which was passed through the image recording section without being subjected to image recording is passed through the erasing section one or more times further, the stimulable phosphor sheet may be manually fed to the erasing section for conducting image erasing so that the sheet becomes immediately reusable for image recording.

BRIEF DESCRIPTION OF THE DRAWING

The single drawing is a schematic view showing an embodiment of the radiation image recording and read-out apparatus in accordance with the present invention.

DESCRIPTION OF THE PREFERRED EMBODIMENTS

The present invention will hereinbelow be described in further detail with reference to the accompanying drawing.

Referring to the drawing, a sheet conveyance circulation path 26 is constituted by endless belts 1, 2, 3, 4, 5, 6, 7, 8, 9 and 10, guide rollers 11, 12, 13 and 14, rotated respectively by the endless belts 1, 6, 7 and 10, guide plates 15, 16, 17, 18, 19, 20 and 21, and nip rollers 22, 23, 24 and 25. A plurality of (by way of example, six) stimulable phosphor sheets 30 are positioned in spaced relation to each other on the circulation path 26 and are conveyed in the direction as indicated by the arrow A by the endless belts 1 to 10 and nip rollers 22, 23, 24 and 25 as the sheet circulating and conveying means.

The endless belts 2 and 3 are positioned to vertically hold the stimulable phosphor sheet 30 therebetween. An image recording section 40 is constituted by an image recording stand 41 positioned on the left side of the endless belts 2 and 3, and a radiation source 42, e.g. an X-ray source, spaced from the image recording stand 41 to stand face to face with the endless belts 2 and 3. When a radiation image of an object 43 is recorded on the sheet 30, the sheet 30 is held between the endless belts 2 and 3, and the radiation source 42 is activated with the object 43 standing in front of the image recording stand 41. In this manner, the sheet 30 is exposed to a radiation passing through the object 43 to have a radiation image of the object 43 stored in the sheet 30.

An image read-out section 50 is positioned at the lower section of the circulation path 26. At the image read-out section 50, a laser beam source 51 is positioned above the endless belt 8 constituting a part of the image read-out section 50, and a mirror 53 and a galvanometer mirror 54 are positioned for scanning a laser beam 52 emitted by the laser beam source 51 in the width direction of the sheet 30 placed on the endless belt 8. The galvanometer mirror 54 is swung in both ways to scan the laser beam 52 in the main scanning direction on the sheet 30 carrying the radiation image stored therein. The sheet 30 which has been subjected to image recording at the image recording section 40 is then conveyed by the sheet circulating and conveying means to the image read-out section 50. A light guiding reflection mirror 55 and a light guide member 56 are positioned along the main scanning direction at the scanning portion of the laser beam 52 on the sheet 30. When the sheet 30 is exposed to the laser beam 52, the sheet 30 emits light in proportion to the stored radiation energy. The light emitted by the sheet 30 directly towards the light guide member 56 and the light emitted by the sheet 30 and reflected by the light guiding reflection mirror 55 enter the light guide member 56 from a light input face 56A thereof, and is guided inside of the light guide member 56 through total reflection to a light output face 56B thereof. The light is thus detected by a photomultiplier 57 connected to the light output face 56B of the light guide member 56. Simultaneously with the scanning of the sheet 30 by the laser beam 52 in the main scanning direction, the sheet 30 is moved by the endless belt 8 in the sub-scanning direction as indicated by the arrow A approximately normal to the main scanning direction, so that the whole surface of the sheet 30 is scanned by the laser beam 52. The electric image signal S1 generated by the photomultiplier 57 is sent to an image processing circuit 60 for processing the electric image signal S1. The image signal S1 thus processed is then sent to an image reproducing apparatus 61. The image reproducing apparatus 61 may be a display device such as a CRT, or a device for recording a visible image by point-by-point scanning on a photographic film. Or, the image signal may be stored in a storage means such as a magnetic tape.

After image read-out is finished, the sheet 30 is conveyed by the endless belts 9 and 10 via the guide plate 18, the nip rollers 22, the guide plate 19 and the nip rollers 23 to an erasing section 70 comprising a case 71 and many erasing light sources 72, e.g. fluorescent lamps, arranged within the case 71. After a shutter 73 is opened, the sheet 30 is conveyed into the case 71 by the nip rollers 23. Then, the shutter 73 is closed, and the erasing light sources 72 are turned on. The erasing light sources 72 mainly emit light having a wavelength within the stimulation wavelength range for the stimulable phosphor constituting the sheet 30. When the sheet 30 is exposed to the erasing light, the radiation energy remaining in the sheet 30 after the image read-out is released. At this time, since the shutter 73 is closed, there is no erasing light leaking into the image read-out section 50 and accordingly no noise is generated in the read-out signal.

After the radiation energy remaining in the sheet 30 is erased to such an extent that another image recording on the sheet 30 is possible, the nip rollers 24 are rotated and the sheet 30 is conveyed out of the erasing section 70. Then, the sheet 30 is sent via the guide plate 20 to the nip rollers 25, and then conveyed by the nip rollers 25 along the guide plate 21 onto the endless belt 1 and to the image recording section 40 at which the sheet 30 is reused for image recording.

The erasing section 70, and the endless belts 1 to 10 and the nip rollers 22 to 25 are respectively controlled by an erasing control section 70A and a sheet conveyance control section 26A and are operated as described above. The image signal S1 generated by the photomultiplier 57 is sent to the image processing circuit 60 and to an energy level detecting circuit 80. The energy level detecting circuit 80 also receives a light exposure amount signal S2 which is sent from the erasing control section 70A and which represents the amount of light exposure (illuminance x exposure time) at the erasing section 70. The image signal S1 corresponds to the level of the radiation energy stored in the sheet 30, and the light exposure amount corresponds to the level of the radiation energy released by the sheet 30 at the erasing section 70. Therefore, by way of example, the energy level detecting circuit 80 indirectly calculates the maximum level of the radiation energy estimated to remain in the sheet 30 ejected from the erasing section 70 and generates an energy level signal S3 on the basis of the maximum value of the image signal S1 (i.e. normally the image signal at the background portion of the radiation image, which represents the maximum level of the radiation energy) and the light exposure amount signal S2 representing the light exposure amount at the erasing section 70. The energy level detecting circuit 80 sends the energy level signal S3 representing the maximum level of the residual radiation energy to a control circuit 81 which also receives a sheet position signal S4 sent by the sheet conveyance control section 26A and calculates the maximum radiation energy level of each sheet 30.

The light exposure amount (illuminance x exposure time) on the sheet 30 at the erasing section 70 may be maintained constant or may be changed in accordance with the level of the radiation energy in the sheet 30 by detecting it on the basis of, for example, the image signal S1. In any case, at the erasing section 70, the sheet 30 is exposed to the erasing light in an amount sufficient to almost completely release the normally assumed maximum level of the residual radiation energy in the sheet 30 and to make the sheet 30 reusable for image recording.

As described above, in special radiation image recording, the sheet 30 is exposed to a very large amount of the radiation. In this case, the level of the radiation energy remaining in the sheet 30 after image read-out becomes very high, and the residual radiation energy is not completely released from the sheet 30 at the erasing section 70, causing a problem to arise in the next image recording. In order to eliminate the problem, a predetermined energy level signal S5 representing a predetermined value of the maximum residual radiation energy level in the sheet 30, i.e. such a value that a problem arises in the next image recording when the level of the residual radiation energy in the sheet 30 exceeds the value, is sent from a signal generating circuit 82 to the control circuit 81. The control circuit 81 compares the predetermined energy level signal S5 with the aforesaid energy level signal S3. Normally, the maximum level of the residual radiation energy is lower than the predetermined value. In the special case where the maximum level of the residual radiation energy in the sheet 30 exceeds the predetermined value, the control circuit 81 generates and holds a pass signal S6. When the signal indicating that the sheet 30 has been conveyed to the image recording section 40 is sent from the sheet conveyance control section 26A, the control circuit 81 outputs the pass signal S6 to the sheet conveyance control section 26A. Upon receiving the pass signal S6, the sheet conveyance control section 26A maintains the endless belts 2 and 3 operating, instead of stopping them to maintain the sheet 30 standing still at the predetermined image recording position at the image recording section 40. In this manner, the sheet 30 carrying the residual radiation energy at a level exceeding the predetermined value is passed through the image recording section 40 without being subjected to image recording. Since the sheet 30 exhibiting the particularly high level of the residual radiation energy and unsuitable for image recording is not used for image recording, no incorrect radiation image is recorded and reproduced with the sheet 30.

At the image read-out section 50, the special sheet 30 described above may be conveyed in the same manner as the normal case. However, the image signal detected from the special sheet 30 should not be sent to the image processing circuit 60, and the endless belt 8 should preferably be operated at a speed higher than the feed speed for scanning in the sub-scanning direction to quickly convey the sheet 30.

Since the aforesaid special sheet 30 has once been passed through the erasing section 70, the level of the residual radiation energy in the sheet 30 is lower than the value immediately after the previous image read-out for the sheet 30. Therefore, when the image signal S1 detected from the sheet 30 when it passes through the image read-out section 50 is sent to the energy level detecting circuit 80, the energy level signal S3 may become lower than the predetermined energy level signal S5. In this case, therefore, the pass signal S6 is not output by the control circuit 81, and normal image recording is conducted on the sheet 30 when the sheet 30 is conveyed to the image recording section 40. However, if the energy level signal S3 is still higher than the predetermined energy level signal S5, the pass signal S6 is again output for the sheet 30, and the next image recording is not conducted on the sheet 30. However, since the residual radiation energy is released by the sheet 30 each time it is passed through the erasing section 70, the sheet 30 ultimately becomes reusable for image recording.

Exposure of the sheet 30 to a very large amount of the radiation is very rare. Therefore, even though the sheet 30 which was exposed to a very large amount of the radiation is not used at some radiation image recording and read-out steps, it is possible to continuously conduct radiation image recording and read-out by use of the other sheets 30. Also, since the erasing time is not increased at the erasing section 70 when the sheet 30 which was exposed to a very large amount of the radiation is conveyed to the erasing section 70, the sheets 30 do not become congested at the erasing section 70, and it becomes possible to conduct radiation image recording and read-out continuously and quickly.

In the case where the position of each sheet 30 on the circulation path 26 is indicated by a position display means, the sheet 30 detected by the control circuit 81 to be impossible to reuse directly should preferably be indicated by the position display means. In this case, when image recording and read-out operations are finished while the unreusable sheet 30 remains, it becomes possible to convey the unreusable sheet 30 manually to the erasing section 70, to erase the residual radiation energy in the sheet 30 for a long time at the erasing section 70 before the apparatus is restarted, and to reuse the sheet 30 for image recording and read-out immediately when the apparatus is restarted.

In the aforesaid embodiment, the level of the residual radiation energy in the sheet 30 ejected from the erasing section 70 is indirectly detected on the basis of the image signal S1 detected from the sheet 30 and the light exposure amount of the sheet 30 at the erasing section 70. However, the level of the residual radiation energy in the sheet 30 ejected from the erasing section 70 may also be detected directly, or may be detected indirectly on the basis of the radiation exposure amount of the radiation source 42 and the erasing light exposure amount of the sheet 30 at the erasing section 70.

Also, in the aforesaid embodiment, the maximum level of the residual radiation energy in the sheet 30 ejected from the erasing section 70 is compared with the predetermined value. However, it is also possible to compare the average value of the residual radiation energy levels in the sheet 30 with the predetermined value and to pass the sheet 30 through the image recording section 40 without subjecting it to image recording when the average value exceeds the predetermined value.

The number of the stimulable phosphor sheets 30 positioned on the circulation path 26 is not limited to five. However, the effect of increasing the processing speed by passing a special sheet 30 through the image recording section 40 without conducting the image recording is obtained only when two or more stimulable phosphor sheets are used.

I claim:

1. A radiation image recording and read-out apparatus comprising:
   i) circulating and conveying means for conveying a plurality of stimulable phosphor sheets along a predetermined circulation path,
   ii) an image recording section positioned in said circulation path for recording the radiation image of an object on each of said stimulable phosphor sheets by exposing each said stimulable phosphor sheet to radiation passing through said object,
   iii) an image read-out section positioned in said circulation path and provided with a stimulating ray source for emitting stimulating rays for scanning said stimulable phosphor sheet carrying said radiation image stored thereon at said image recording section, and photoelectric read-out means for detecting light emitted by said stimulable phosphor sheet when scanned by said stimulating rays, to obtain an electrical image signal, iv) an erasing section positioned in said circulation path for, prior to the next image recording on said stimulable phosphor sheet for which the image read-out has been conducted at said read-out section, having said stimulable phosphor sheet release the radiation energy remaining in said stimulable phosphor sheet, v) energy level detecting means for detecting the level of residual radiation energy in said stimulable phosphor sheet when ejected from said erasing section, and vi) control means for receiving the output of said energy level detecting means and controlling said circulating and conveying means so that, when a stimulable phosphor sheet detected to exhibit a residual radiation level exceeding a predetermined value is fed to said image recording section, said control means causes said circulating and conveying means to operate without stopping said stimulable phosphor sheet at said recording section, to thereby pass said sheet through said image recording section without subjecting said sheet to image recording.

2. An apparatus as defined in claim 1 wherein said energy level detecting means is constituted to detect said level of residual radiation energy indirectly on the basis of said electric image signal detected from said stimulable phosphor sheet at said image read-out section and the erasing light exposure amount of said stimulable phosphor sheet at said erasing section.

3. An apparatus as defined in claim 1 wherein said energy level detecting means is constituted to directly detect said level of residual radiation energy in said stimulable phosphor sheet ejected from said erasing section.

4. An apparatus as defined in claim 1 wherein said predetermined value is the predetermined maximum level of the residual radiation energy, and said output of said energy level detecting means represents the maximum level of the residual radiation energy in said stimulable phosphor sheet ejected from said erasing section.

5. An apparatus as defined in claim 1 further comprising a position display means for indicating the positions of said stimulable phosphor sheets on said circulation path.

6. An apparatus as defined in claim 5 wherein said position display means indicates said stimulable phosphor sheet detected to exhibit a residual radiation energy level exceeding said predetermined value.

7. An apparatus as defined in claim 1 wherein said circulating and conveying means comprises endless belts and nip rollers.

* * * * *